K. W. LINDMAN.
BALL HOLDER FOR BALL BEARINGS.
APPLICATION FILED APR. 10, 1918.

1,329,089.

Patented Jan. 27, 1920.

Inventor:
Konrad W. Lindman
By
Attys.

UNITED STATES PATENT OFFICE.

KONRAD WERNER LINDMAN, OF STOCKHOLM, SWEDEN, ASSIGNOR, BY MESNE ASSIGNMENTS, TO NORDISKA KULLAGER AKTIEBOLAGET, OF GOTTENBORG, SWEDEN, A LIMITED COMPANY OF SWEDEN.

BALL-HOLDER FOR BALL-BEARINGS.

1,329,089.  Specification of Letters Patent.  Patented Jan. 27, 1920.

Application filed April 10, 1918. Serial No. 227,615.

*To all whom it may concern:*

Be it known that I, KONRAD WERNER LINDMAN, subject of the King of Sweden, residing at Västra Trädgårdsgatan 4, Stockholm, in the Kingdom of Sweden, have invented certain new and useful Improvements in Ball-Holders for Ball-Bearings; and I do hereby declare the following to be a full, clear, and exact description of the invention, such as will enable others skilled in the art to which it appertains to make and use the same.

In order in a ball bearing to be enabled to keep the balls at some distance apart from one another in the row of balls running around the shaft, so that they do not come into contact with one another, and also in order to guide the whole row of balls and securely hold the balls in their position in the ball-paths, so that the balls are prevented from dropping out when the revolving ring is free, there is usually employed a ring or sleeve, provided with notches for the balls, or furnished with laps or projections suitable for embracing the balls. A feature common to these ball holders is that the ball holder consists of a single piece, or of pieces joined together, and that the balls are kept and prevented from dropping out of the path solely by the ball holder thus obtained.

The present invention, on the other hand, relates to a ball holder which consists of two separate but coöperating parts, namely of a ring-shaped washer arranged on the outer side of the bearing, which washer supports the balls on one side, and by a ring, provided with projections between the balls or notches corresponding to the balls, which ring supports the balls on the other side, but does not embrace them to such an extent that the balls are securely held in the ball path solely by the latter. By this device is attained the advantage that the intermediate piece between the balls—the ring with projections or notches—need not be made of flexible or elastic material, but can be manufactured or cast of hard metal which will endure wear or tear.

Further, the intermediate piece need not be wrought with such precision as the above-mentioned ball holders require, inasmuch as the surface of contact with the balls can in the present construction be made comparatively small.

In order to illustrate the invention, there is shown in the accompanying drawing, by way of example, a form thereof.

Figure 1:
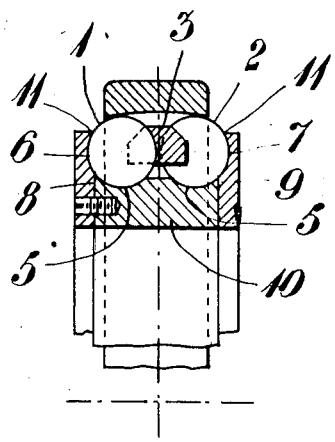
Figure 2:
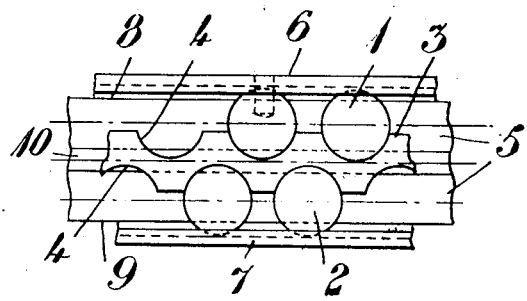

Figure 1 shows a section of a two-rowed ball bearing, provided with a ball holder of the kind in question. Fig. 2 shows a part of the ball holder (rectified), viewed from above. The balls in the ball row 1, as well as in the ball row 2, are held at a certain distance from one another by means of the ring 3 running all around, which ring is provided with notches 4 for the balls, corresponding to the size of the balls. These notches 4, however, embrace a smaller part of the balls than their half central circumference, or at most so large a part that the balls can be inserted without pressure in the ball-paths 5 and the notches 4. The balls in the ball row 1, or 2, are supported, as shown by Fig. 1, also by the ring-shaped washer 6, or the washer 7, which washers or rings project outside the outer surfaces 8 and 9 of the ball paths. By these rings 6 and 7, which are detachably fixed to the ring 10, the points of support, or surfaces of support, of the balls will embrace a larger part of the balls than the half sphere, whereby the balls will be prevented from falling out of the ball paths, when the inner ring is free and not embraced by the outer ring.

According to the form illustrated in the drawing, the ring-shaped washers 6 and 7, as shown by the drawing (Fig. 1), are provided with grooves corresponding to the curvatures of the balls, and they extend so far out toward the circumference that their outer points of contact 11 with the balls lie farther from the shaft of the bearing than the center of the balls, whereby a secure holding of the balls is attained.

The ring 3 may be formed of a strip of metal, which is bent in a form of a ring, whereupon the ends of the strip are connected with each other by way of soldering, welding, rivets or in other way, or else the rings also may be formed of tubes of metals cut in pieces of a length corresponding to the breadth of the rings, out of which rings the notches 4 are formed by punching, pressing or in other way.

Having thus described my invention, I declare that what I claim is:—

1. In a ball bearing comprising outer and inner bearing rings and a row of balls between the rings, the combination of a ring between the bearing rings provided with curved notches into which the balls may be inserted axially of the bearing, and a ring member adapted to be detachably secured to the inner bearing ring and having an inner face provided with a groove conforming to the curvature of the balls and adapted to coöperate with the notched ring in holding the balls in place on the inner ring of the bearing.

2. In a ball bearing comprising outer and inner bearing rings and a row of balls between the rings, the combination of a ring between the bearing rings provided with notches having a curvature of substantially the same radius as the balls and so limited that the outer points of contact with the balls do not project beyond the transversal middle plane of the balls so that the balls may be inserted into the ring axially of the bearing, and a ring member adapted to be detachably secured to the inner bearing ring and having an inner face provided with a groove conforming to the curvature of the balls and adapted to coöperate with the notched ring in holding the balls in place on the inner ring of the bearing.

3. In a ball bearing comprising outer and inner bearing rings and a pair of rows of balls between the rings, the combination of a ring between the two rows of balls and provided with notches on each side having substantially the same curvature as the balls and into which the latter may be inserted axially of the bearing, and a ring member detachably secured to each end of the inner bearing ring, each of the ring members having on its inner face a groove of substantially the same curvature as the balls and into which the balls are fitted whereby the ring members coöperate with the notched ring in holding the balls in place on the inner ring of the bearing.

4. In a ball bearing comprising outer and inner bearing rings and a pair of rows of balls between the rings, the combination of a ring between the two rows of balls and provided with notches on each side having substantially the same curvature as the balls and into which the latter may be inserted axially of the bearing, and a ring member detachably secured to each end of the inner bearing member, each ring member being provided on its inner face with a groove corresponding in curvature with the curvature of the balls and with its outer edge lying farther from the axis of the bearing than does the center of the balls whereby the ring members coöperate with the notched ring in holding the balls in place on the inner ring of the bearing.

In testimony whereof I affix my signature.

KONRAD WERNER LINDMAN.

Witnesses:
 AUG. HAGELIN,
 ALMA PETTERSON.